US009518345B2

(12) United States Patent
Barth et al.

(10) Patent No.: US 9,518,345 B2
(45) Date of Patent: Dec. 13, 2016

(54) METHOD FOR PRODUCING A SPINNABLE SILICA SOL MATERIAL

(75) Inventors: Ekkehard Barth, Köln (DE); Bastian Mahr, Bergisch Gladbach (DE)

(73) Assignee: JIANGSU SYNECOUN MEDICAL TECHNOLOGY CO., LTD, Taizhou (CN)

( * ) Notice: Subject to any disclaimer, the term of this patent is extended or adjusted under 35 U.S.C. 154(b) by 233 days.

(21) Appl. No.: 14/232,857

(22) PCT Filed: Jul. 17, 2012

(86) PCT No.: PCT/EP2012/063989
§ 371 (c)(1),
(2), (4) Date: Feb. 12, 2014

(87) PCT Pub. No.: WO2013/011016
PCT Pub. Date: Jan. 24, 2013

(65) Prior Publication Data
US 2014/0161707 A1 Jun. 12, 2014

(30) Foreign Application Priority Data
Jul. 21, 2011 (EP) .................................... 11174884

(51) Int. Cl.
| C04B 35/624 | (2006.01) |
| C01B 33/14 | (2006.01) |
| D01D 5/12 | (2006.01) |
| D04H 3/004 | (2012.01) |
| C04B 35/622 | (2006.01) |
| C04B 35/626 | (2006.01) |
| C08G 77/02 | (2006.01) |
| C08L 77/02 | (2006.01) |
| B29C 55/00 | (2006.01) |
| C01B 33/148 | (2006.01) |
| C01B 33/143 | (2006.01) |

(52) U.S. Cl.
CPC ............ *D04H 3/004* (2013.01); *B29C 55/005* (2013.01); *C01B 33/148* (2013.01); *C04B 35/624* (2013.01); *C04B 35/6224* (2013.01); *C04B 35/6263* (2013.01); *C04B 35/62635* (2013.01); *C04B 35/62685* (2013.01); *C08G 77/02* (2013.01); *C08L 77/02* (2013.01); *D01D 5/12* (2013.01); *C01B 33/14* (2013.01); *C01B 33/143* (2013.01); *C04B 2235/3418* (2013.01); *C04B 2235/441* (2013.01); *Y10T 442/60* (2015.04)

(58) Field of Classification Search
CPC .... C04B 35/6224; C04B 35/624; C08L 83/02; C01B 33/14; C01B 33/143; C01B 33/148; B29C 55/005; D01D 5/12
See application file for complete search history.

(56) References Cited

U.S. PATENT DOCUMENTS

| 9,221,690 B2 * | 12/2015 | Barth | ................... C04B 35/6224 |
| 2010/0174045 A1 * | 7/2010 | Thierauf | ................... A61L 27/18 528/296 |
| 2011/0183419 A1 | 7/2011 | Glaubitt | |
| 2013/0145964 A1 | 6/2013 | Barth et al. | |

FOREIGN PATENT DOCUMENTS

| DE | 19609551 | 7/1997 |
| WO | 2008/086970 | 7/2008 |
| WO | 2008/148384 | 12/2008 |
| WO | 2011/154361 | 12/2011 |

OTHER PUBLICATIONS

International Search Report for PCT/EP2012/063989 Mailed Nov. 20, 2012.

* cited by examiner

*Primary Examiner* — David M Brunsman
(74) *Attorney, Agent, or Firm* — McBee Moore Woodward & Vanik IP, LLC

(57) ABSTRACT

In a process for producing a spinnable silica sol material, a viscosity value $V_S$ is stipulated which the spinnable silica sol material should have after ripening. A viscosity value $V_R$ corresponding to $V_S$ which the silica sol material has before ripening is ascertained. An aqueous acid solution and a hydrolysable silicon compound are combined. The combined mixture is evaporated to give a single-phase solution while measuring the viscosity of the mixture and the evaporation process is terminated upon reaching the viscosity value $V_R$. The single-phase solution thus obtained is then ripened to give a silica sol material with the viscosity value $V_S$. The process exhibits reduced waste and more exact reproducibility of the spinning sol properties during the synthesis and an increased space-time yield in the production of biologically degradable and/or resorbable fibers and nonwoven fabrics.

13 Claims, 1 Drawing Sheet

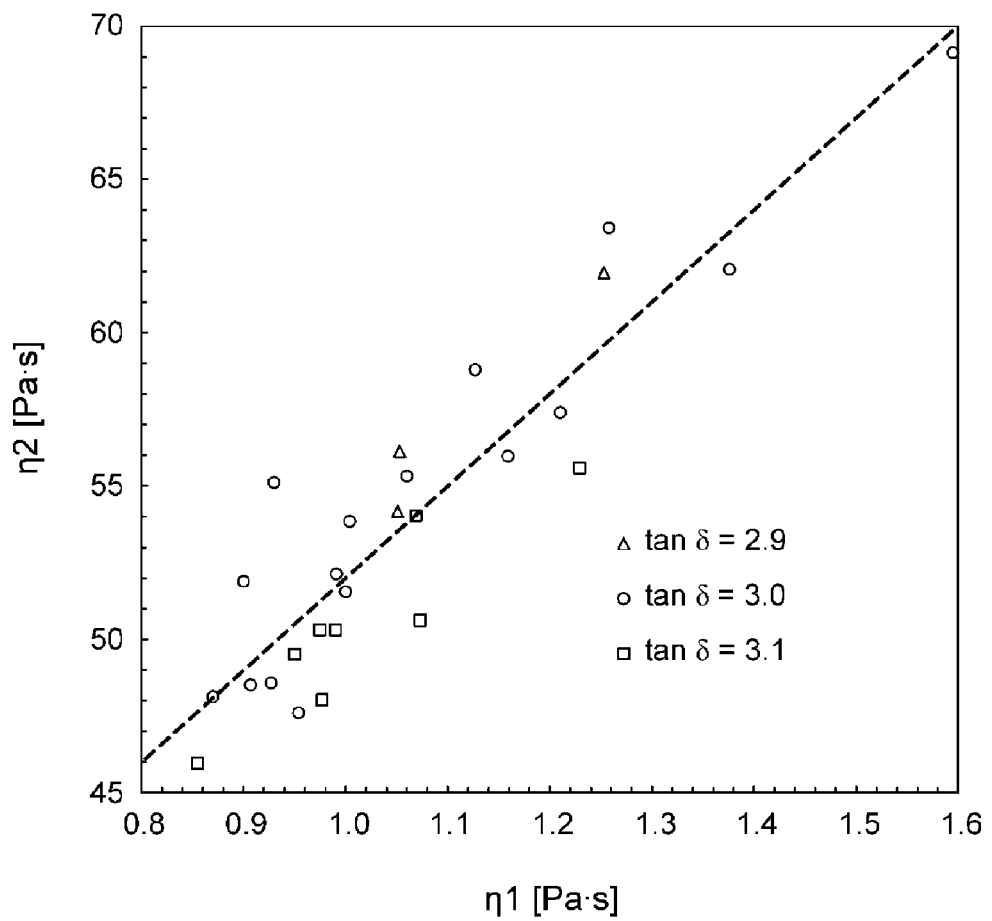

METHOD FOR PRODUCING A SPINNABLE SILICA SOL MATERIAL

CROSS REFERENCE TO RELATED APPLICATIONS

This application is a §371 National Stage Application of PCT/EP2012/063989, filed Jul. 17, 2012, which claims priority to European Application No. 11174884.4, filed Jul. 21, 2011.

BACKGROUND OF THE INVENTION

Field of the Invention

The present invention relates to a process for producing a spinnable silica sol material taking into consideration viscosities as process parameters. It further relates to spinnable silica sol material produced according to this process, to a process for producing a fibre or a nonwoven fabric based on such a material and to a fibre obtained thereby or to a nonwoven fabric obtained thereby.

Description of Related Art

Biologically degradable and/or resorbable fibres and non-woven fabrics which are obtained from a spinnable silica sol material are known in the prior art. The fibres and nonwoven fabrics can be used for example in medical technology and/or human medicine, particularly in wound treatment. For example, WO 2008/086970 A1 describes a silica sol material and its use for producing biologically degradable silica gel materials. The materials such as fibres, nonwoven fabrics, powders, in monolithic form or as a coating can be used for example in medical technology and/or human medicine, especially for wound treatment.

The production of such fibres and nonwoven fabrics can be divided into four steps:
1. Hydrolysis-condensation of a hydrolysable silicon compound
2. Solvent removal
3. Ripening
4. Spinning Patent specification DE 196 09 551 C1 discloses by way of example a process for producing biologically degradable/biologically resorbable fibre structures. This document relates to biologically degradable and/or biologically resorbable (continuous) fibres and processes for their production. The (continuous) fibres are obtained by partial or complete hydrolytic condensation of one or more hydrolytically condensable silicon compounds and/or precondensates derived from these. The hydrolytic condensation is carried out by the action of water and optionally in the presence of a catalyst and/or of a solvent and preferably according to a sol-gel process. This partial or complete hydrolytic condensation gives a spinning mass which can be processed in accordance with customary methods to give continuous and/or long and/or short fibres.

According to one embodiment, the process has the following features:
- a spinning mass is prepared by hydrolytic (partial) condensation of one or more silicon compounds $SiX_4$ (which is defined above) and/or precondensates derived from these;
- the hydrolytic condensation is optionally carried out in the presence of a catalyst and/or of a solvent, by adding water;
- an amount of water is used such that the molar ratio $SiX_4:H_2O$ is between 1:1 and 1:10, preferably between 1:1.5 and 1:2.5;
- a phase transfer catalyst or an amount of a water-soluble solvent (LM) or solvent mixture is used such that the molar ratio $LM:SiX_4$ is $\geq 1$, preferably >1;
- after hydrolysis has concluded and a dynamic equilibrium has been established, the LM is removed until the resulting mixture has a viscosity between 0.05 and 50 Pa·s, preferably between 0.5 and 2 Pa·s, at room temperature and a shear gradient of $20\ s^{-1}$;
- after removing the solvent, the resulting mixture is subjected to filtration;
- after the filtration, the resulting mixture is left to stand until it achieves spinnability;
- threads are drawn from the spinning mass and these are optionally dried.

WO 2008/086970 A1 discloses a similar process, although in this the hydrolysis-condensation step is carried out over a period of at least 16 hours at a temperature of 0° C. to 80° C. with acid catalysis. By means of subsequent evaporation, a single-phase solution with a viscosity in the range from 0.5 to 2 Pa·s at a shear rate of $10\ s^{-1}$ at 4° C. is said to be produced. This solution is then cooled and it is subjected to a kinetically controlled ripening, during which a homogeneous sol is reportedly formed.

WO 2008/148384 A1 discloses a further process for producing a polyethoxysilane (PES) material. The material is obtained by (a) carrying out a first hydrolysis-condensation reaction (HCR) of at most one radical X from one or more different Si compounds of the formula $SiX_4$ in which the radicals X are identical or different, and are hydroxy, hydrogen or ethoxy (EtO), with acidic catalysis at an initial pH of 0 to <7, in the presence of ethanol (EtOH) or an ethanol/water mixture as solvent, over a period of 1 to 24 h at a temperature of 0° C. to 78° C. (boiling point of ethanol), (b) carrying out a second HCR of the material obtained in step (a) with the simultaneous removal of the solvent by successive evaporation in a gas-diffusion-tight container at a pressure of 100 to 1013 mbar, preferably at a slight underpressure of 300 mbar to 800 mbar, a temperature of 50-78° C., preferably of about 70° C., to the point of a drastic viscosity increase (at a shear rate of $10\ s^{-1}$ at 4° C.) to 0.5 to 2, preferably 1 Pa·s, to constant weight and to the point of the formation of a cyclotetrasiloxane of the general formula $((SiO(OH)_{0.75}(OET)_{1.25} \times \frac{1}{64}\ H_2O)_4$ and of molar mass of 4*about 114 g=about 456 g;

(c) cooling this PES material in a closed, preferably gas-diffusion-tight container in a period from a few (2 to 5) minutes to a few (0.2 to 5, preferably 0.5) hours, and (d) converting the PES material obtained from (c) by means of a third HCR into an rPES material.

WO 2009/077104 A1 discloses a similar process to that in WO 2008/148384 A1 in which the evaporation takes place in a closed apparatus optionally by continuously introducing a chemically inert entrainer gas stream.

In all of the cited disclosures, it is indicated that the ripened silica sol material should have a viscosity in a preferred range in order to be able to spin it.

However, all of the stated processes from the prior art can supply a specific statement regarding the viscosity of the spinnable material with on-spec loss factor after ripening, but give a relatively wide range for the viscosity (between 30 and 100 Pa·s). This has the following disadvantages for the synthesis and spinning of the sol:

In contrast to the measurement of the dynamic viscosity, the measurement of the loss factor is realized not without considerable expenditure inline or online Consequently, it is essential to measure the loss factor offline. Since the viscosity of the sol changes within very small time intervals depending on the selected ripening temperature, especially at the end of ripening, this often leads to loss of the mixture. This loss of the sol can only be prevented through increased measurement effort and personnel expenditure resulting therefrom.

The operating parameters of the spinning plant must be adapted for each new sol in order to obtain an on-spec nonwoven fabric which is biodegradable.

Adaptation of the operating parameters leads to a time delay (reduction in space-time yield) and also to loss of spinnable sol.

If the spinnable material has a high viscosity (>65 Pa·s), then the space-time yield drops during spinning if on-spec nonwoven fabrics are still desired.

SUMMARY

The object of the present invention therefore consisted in addressing the disadvantages of the prior art and providing an improved process for producing silica sol materials, especially as regards the termination criterion following reactive evaporation, spinnability, and also the space-time yield during spinning. The process should permit a reproducible production of spinnable silica sol materials. The process should be scalable on an industrial scale and permit a more precise prediction of the viscosity of the on-spec sol.

The object is achieved by a process for producing a silica sol material in which the viscosity during the removal of the solvent is measured for example by means of suitable measuring probes, and the removal of the solvent is terminated immediately upon reaching a desired viscosity which also correlates with the loss factor. Furthermore, it is a process in which, after gathering a complete set of material data, it is possible to dispense with the measuring of the loss factor during the ripening of the sol. Instead, the dynamic viscosity readily accessible by means of measuring probes inline or online is used as the termination criterion.

Surprisingly, it has been found that the viscosity of the silica sol material after the removal of the solvent correlates with the viscosity of the ripened mass.

The prior art (see for example WO 2008/086970 A1 and WO 2008/148384 A1) describes that it is necessary for obtaining a spinnable sol with a viscosity between 30 and 100 Pa·s at a shear rate of $10 \text{ s}^{-1}$ for the single-phase solution after removing the solvent to preferably have a dynamic viscosity η in the range from 0.5 to 2 Pa·s at a shear rate of $10 \text{ s}^{-1}$ at 4° C. However, it is not described what influence the viscosity after removing the solvent has on the viscosity of the spinnable material.

Surprisingly, however, with the help of a precise adjustment of the viscosity after removing the solvent, the viscosity of the sol according to the invention can be predicted at ±10 Pa·s.

The present invention therefore firstly provides a process for producing a spinnable silica sol material which comprises the following steps:

(a) stipulating a viscosity value $V_S$ which the spinnable silica sol material should have after ripening,
(b) ascertaining the viscosity value $V_R$ corresponding to $V_S$ which the silica sol material has before ripening,
(c) combining an aqueous acid solution and a hydrolysable silicon compound,
(d) evaporating the mixture combined in step (c) to give a single-phase solution while measuring the viscosity of the mixture and terminating the evaporation process upon reaching the viscosity value $V_R$,
(e) ripening the single-phase solution obtained in step (d) to give a silica sol material with the viscosity value $V_S$.

BRIEF DESCRIPTION OF THE DRAWINGS

FIG. 1 represents embodiments described herein.

DETAILED DESCRIPTION OF A PREFERRED EMBODIMENT

The present invention will be described below inter alia taking into consideration preferred embodiments. The embodiments can be combined arbitrarily unless the opposite arises from the context.

The naming of the individual steps of the process according to the invention with the letters (a) to (e) does not mean that the individual steps necessarily have to take place in the stated order. Only steps (c), (d) and (e) have to be carried out in the stated order. Step (a) must take place before step (b) and step (b) must take place before step (d). Otherwise, the order can also be varied; for example, the order (c), (a), (b), (d), (e) is also conceivable.

In step (a) of the process according to the invention, the properties which the spinnable silica sol material should have are stipulated. More specifically, a viscosity value $V_S$ is stipulated which the spinnable silica sol material should have. This viscosity value is the value of a physical parameter which gives information about the rheological properties of the spinnable silica sol material. The physical parameter (viscosity parameter) can be for example the dynamic shear viscosity of the silica sol material, which can be measured using a rotary viscometer. The corresponding physical parameters which indicate the rheological behaviour, and their dependencies on one another are known to the person skilled in the art of rheology. Which physical parameter is used for stipulating the viscosity value depends inter alia on its measurability in step (d) of the process according to the invention. It makes sense to use a physical parameter which can be measured easily, quickly and reproducibly.

In a preferred embodiment, the viscosity values $V_S$ and $V_R$ are dynamic viscosities which are measured by measurement probes within the mixture. In this way, online or inline monitoring of the viscosities is possible. These parameters can be ascertained in each case in accordance with DIN EN ISO 3219.

The stipulated viscosity value $V_S$ (DIN EN ISO 3219) is preferably in the range from 30 to 100 Pa·s, particularly preferably in the range from 35 to 70 Pa·s, very particularly preferably from 40 to 55 Pa·s at a shear rate of $10 \text{ s}^{-1}$ at 4° C., or in the corresponding ranges of another physical parameter derivable from the dynamic viscosity or mathematically related thereto.

In step (b) of the process according to the invention, using the viscosity value $V_S$ of the silica sol material after the ripening, the viscosity value $V_R$ of the silica sol material corresponding to this viscosity value $V_S$ after the removal of the solvent and before the ripening is ascertained. The correlation between the value $V_S$ and $V_R$ can be ascertained empirically in an experimental series. In our experiments, we found that a linear or at least readily calculable relationship is established, meaning that the viscosity values can be ascertained easily. This determination can of course be implemented in a process control unit or in another data processing unit.

In step (c) of the process according to the invention, an aqueous acid solution and a hydrolysable silicon compound are combined.

Instead of the rapid addition described in the prior art (WO 2008/086970 A1, page 4, line 24) of an aqueous acid to the hydrolysable silicon compound, in the present invention these components are preferably combined in a controlled manner. Combining in a controlled manner is understood as meaning that the combining does not take place rapidly, not quickly, but over a defined extended period. The combining takes place such that the temperature of the mixture remains within a defined temperature range.

Preferably, the combining in step (c) takes place over a period of at least 15 minutes, particularly preferably at least 30 minutes and even more preferably at least 1 hour. The shorter the period for the metered addition that is chosen, the more likely are additional apparatus measures required in order to be able to dissipate the amounts of heat produced during the reaction and keep the temperature of the reaction mixture within a defined range.

It is surprising that the combining of hydrolysable silicon compound and aqueous acid solution extended over a prolonged period compared to the prior art does not lead to a notably altered mass distribution of the polymers. If, for example, the synthesis process described in WO 2008/086970 A1 is modified such that the addition of the aqueous acid solution to the hydrolysable silicon compound does not take place rapidly, but over a period of one hour, then this has no notable influence on the polymer distribution resulting at the end of the process (after the ripening), for example measured by means of gel permeation chromatography.

However, the controlled combining has significant advantages particularly with regard to a process operated on an industrial scale, for example when observing safety precautions, during process control and with regard to the reproducibility.

It is conceivable to carry out the combining in step (c) of the process according to the invention at a constant rate. It is likewise conceivable to carry out the combining such that the temperature of the reaction mixture develops within a defined range. In the last-mentioned case, there is thus a control loop in which the combining of the components is controlled by the temperature and/or temperature change in the reaction mixture.

In a preferred embodiment of the process according to the invention, the combining in step (c) takes place under quasi-isothermal conditions. The term "quasi-isothermal conditions" is understood as meaning that a chemical reaction is carried out at as constant a temperature as possible. In the present process, in step (c), the reaction would proceed under quasi-isothermal conditions preferably within a bottom temperature range (i.e. measured within the reaction mixture) of ±5° C., preferably of ±2° C., particularly preferably of ±0.5° C.

In a further preferred embodiment of the process according to the invention, the combining of the components in step (c) takes place such that the heat released by the hydrolysis-condensation reaction is used for heating the synthesis mixture. It is therefore possible to avoid overheating the synthesis mixture for example in the case of low-performance or sluggish heat exchangers, and the hydrolysis-condensation reaction can be carried out in a controlled manner at the desired temperature.

The hydrolysis-condensation reaction in step (c) is preferably carried out with stirring.

The term "hydrolysable silicon compound" preferably refers to a silicon compound of the formula (I)

$$SiX_4 \qquad (I)$$

in which the radicals X are identical or different and are hydroxy, hydrogen, halogen, amino, alkoxy, acyloxy, alkylcarbonyl and/or alkoxycarbonyl and are derived from alkyl radicals which are optionally substituted straight-chain, branched or cyclic radicals having 1 to 20 carbon atoms, preferably having 1 to 10 carbon atoms, and can be interrupted by oxygen or sulphur atoms or by amino groups. In a preferred embodiment according to the invention, X in the formula (I) is an optionally substituted straight-chain, branched and/or cyclic alkoxy radical having 1 to 20 carbon atoms, preferably having 1 to 10 carbon atoms.

Particularly preferably, X in the formula (I) is an optionally substituted straight-chain and/or branched $C_1$-$C_5$ alkoxy radical. Further particular preference is given to substituted, but preferably unsubstituted straight-chain and/or branched $C_2$-$C_3$ alkoxy radicals, such as, for example, ethoxy, N-propoxy and/or isopropoxy. According to the invention, very particular preference is given to using tetraethoxysilane (TEOS) as hydrolysable Si compound in the process according to the invention.

The term "aqueous acid solution" describes mixtures and/or solutions which have a pH of 0 to ≤7, preferably from 0 to 2. Besides water and a proton donor, the aqueous acid solution can comprise one or more further substances which serve for example as solubilizers. Preferably, a water-soluble solvent is added. Particular preference is given to ethanol. The aqueous acid solution comprises preferably water and ethanol in the molar ratio of 1:1.27 to 1:1.59, particularly preferably in the molar ratio of 1:1.41.

The proton donor used is preferably nitric acid.

Besides a preferably ethanolic aqueous nitric acid solution, of suitability according to the invention is also an aqueous or alcoholic (preferably an aqueous dilute ethanolic) solution of a physiologically compatible acid (for example citric acid, succinic acid, tartaric acid, acetic acid or ascorbic acid) and at least one essential amino acid (for example L-arginine, particularly preferably L-valine, L-leucine, L-isoleucine, L-phenylalanine, L-thyroxine, L-methionine, L-lycine or L-tryptophan) or nonessential amino acid (for example L-glutamine, L-glutamic acid, L-asparagine, L-aspartic acid, L-cysteine, L-glycine, L-alanine, L-proline, L-histidine, L-tyrosine). Such mixtures and/or solutions form nitrogen monoxide (NO) in a physiological environment with molecular oxygen under enzymatic conditions (by means of a nitroxide synthase, NOS). Moreover, it is also possible to use organic nitrates or nitrate esters (so-called NO donors) such as, for example, ethyl nitrate, which form NO with the help of an organic nitrate reductase. Thiol groups (cysteine) are required for this enzymatic release of NO.

For the hydrolysis of the silicon compound, an amount of water is used such that the molar ratio of $SiX_4$:water is in the range from 1:1.5 to 1:2.5, preferably in the range from 1:1.7 to 1:1.9, particularly preferably in the range from 1:1.7 to 1:1.8.

The combining of the components in step (c) can take place in different ways. It is conceivable to initially charge the hydrolysable silicon compound in the reactor and to add the aqueous acid solution. In this connection, it is conceivable to initially charge the hydrolysable silicon compound in a suitable solvent (for example ethanol in the case of TEOS).

In a further preferred embodiment, in step (c), both the acid and the hydrolysable silicon compound are metered into a solvent in parallel in a controlled manner. Preferably, the hydrolysable silicon compound is mixed beforehand with some of the solvent, preferably 35 to 38% of the solvent. Overall, the amount of solvent therefore preferably does not change. However, at the start proportionately little solvent is present in the reaction vessel into which the acid and the described mixture of some of the solvent and the hydrolysable silicon compound are metered in a controlled manner. This embodiment is of importance particularly with regard to a continuous production process (on an industrial scale). In this embodiment, the acid and the hydrolysable silicon compound can be metered in independently of one another (for example via different reaction vessel openings and pump systems) over different time periods. However, the same time period for the metered addition is preferably selected proportionally to the volume stream. The amount of hydrolysable silicon compound metered in and the amount of acid metered in is preferably constant per time unit. This embodiment of the invention is preferably carried out under quasi-isothermal conditions. Preferably, the hydrolysable silicon compound and the acid are metered in over a period of at least 15 minutes, preferably at least 30 minutes and even more preferably at least 1 hour.

In a further preferred embodiment, in step (c), a hydrolysable silicon compound is metered into an acid located in a solvent. This controlled combining, also referred to hereinbelow as "inverse dosing", surprisingly leads to a new type of sol which is reproducible and can be produced in a controlled manner, but whose physical properties differ from those physical properties described in the prior art. The sol obtained by the inverse dosing can be spun to give a fibre and is also biologically degradable and/or resorbable. Compared to those described in the prior art, this sol has a lower viscosity for the same loss factor.

During inverse dosing, the hydrolysable silicon compound is preferably not dissolved beforehand or dissolved only in a small part of a solvent, preferably 0 to 5%. Overall, the amount of solvent therefore preferably does not change. However, at the start of the reaction, no or proportionately little solvent is present in the reaction vessel to which the silicon compound and the mixture of some of the solvent and the hydrolysable silicon compound are metered in a controlled manner. The inverse dosing is preferably also carried out under quasi-isothermal conditions. Preferably, the amount of hydrolysable silicon compound metered in per time unit is constant or approximately constant. Preferably, the hydrolysable silicon compound is metered in over a period of at least 15 minutes, preferably at least 30 minutes and even more preferably at least 1 hour. Surprisingly, during the inverse dosing, compared to the other embodiments in the prior art and described hitherto, it was also established that the rate of the reaction overall is increased. At a temperature of 37° C. and under otherwise identical conditions, instead of 18 hours for the other controlled metered addition methods, the reaction lasts in total only 4 hours. In the case of the inverse dosing as well, the rate of the reaction is likewise increased with increasing temperature.

After the combining of the components in step (c) and before the evaporation in step (d), the reaction mixture is preferably stirred for some time until a dynamic equilibrium is established.

The reaction time depends on the selected temperature and the period of controlled metered addition. For example, the reaction at a temperature of 55° C. and with a controlled metered addition of the acid to the hydrolysable silicon compound located in the solvent over a period of one hour lasts, on the laboratory scale, for a total of about 5 hours. At a temperature of 37° C. and under otherwise identical conditions, the reaction lasts about 18 hours.

The hydrolysis-condensation is preferably carried out without pressure (i.e. without overpressure at about 101 325 Pa) preferably at a temperature of 0° C. to 78° C. Through corresponding pressure regulation it is also possible to carry out the reaction at temperatures above the boiling point of ethanol (i.e. 78° C.).

In step (d) the solvent is removed. This step is referred to here also as reactive evaporation. During the reactive evaporation, the viscosity of the mixture is measured. Upon reaching a viscosity value $V_R$, the evaporation process is stopped. The measurement of the viscosity can take place "online", "inline" or "offline". For the online or inline measurement, the viscosity is measured continuously by means of a sensor in the mixture. For the offline measurement, samples which are measured in separate analytical equipment are taken at stipulated times. The online and inline measurements are preferred. Corresponding measurement methods and measuring devices for the online, inline and offline measurement are known to the person skilled in the art of rheology.

In a preferred embodiment of the invention, step (d) is carried out in a closed apparatus in which thorough mixing is possible and in which at the same time any solvent present (i.e. for example water, ethanol) can also be evaporated. Preferably, the bottom temperature is kept constant (i.e. ±5° C., preferably ±2° C.) by means of pressure regulation (variable adaptation over time, preferably between 500 and 120 mbar), such that solvent is continuously removed with gentle boiling from the mixture until the viscosity value $V_R$ is reached. The reaction temperature can be selected as described in the prior art, i.e. preferably between 30° C. and 78° C., and particularly preferably between 60° C. and 75° C. Preferably, step (d) is carried out with gentle thorough mixing of the reaction system.

The single-phase solution resulting from step (d) is subjected to ripening in step (e). In contrast to the prior art (WO 2008/148384 A1, page 9, line 31), the single-phase solution is preferably stirred during this ripening process. Thorough mixing of the system by stirring results in the rate of the ripening being slightly increased. Moreover, the thorough mixing of the single-phase solution leads to a build-up of temperature gradients, which in turn brings about better temperature control and therefore a simpler scalability of the process. Preference is given to using a stirrer which causes no bubbles in the single-phase solution. In this connection, those which are based on the principle of a coil have proven to be particularly suitable. The rotational speed of the stirrer is also chosen such that no bubbles can arise in the single-phase solution. Rotational speeds of 4 to 50 rpm, particularly of less than 25 rpm, very particularly those which are less than 10 rpm, have proven to be useful.

By thoroughly mixing the single-phase solution during the ripening, it is also possible to homogeneously incorporate pharmaceutical active ingredients into the sol. In particular, the incorporation of temperature-sensitive active ingredients is especially suitable in this step since the reactive evaporation (associated with the higher reaction temperatures which are required for the evaporation) is already concluded.

For the purposes of the invention, "active ingredients" are defined as substances which, in a low dose in an organism, bring about a specific effect, a reaction. As active ingredient, preference is given to using a medicament, particularly preferably a temperature-sensitive medicament, i.e. an active ingredient which is used for therapeutic purposes on humans or on animal bodies.

Temperature-sensitive active ingredients or medicaments are those whose rate of degradation is considerably increased at temperatures below 8° C., preferably below 2° C.

Of course in step (e) testing can be carried out as to whether the loss factor corresponding to $V_S$ lies within the specification limits.

An important influential parameter during the ripening (step (e)) is the temperature. In principle, the ripening can be carried out at temperatures of up to −80° C. to 78° C. and, with regulation of the pressure, also above this. A sol known according to the prior art can be produced at all temperatures. However, it has proven to be particularly favourable if the ripening in step (e) is carried out at temperatures of from 25° C. to 35° C. Firstly, the production time at these temperatures is considerably shortened (from 2-3 weeks when carrying out the ripening at 4° C. compared to 2 days when carrying out the reaction at 31° C.). The temperature should ideally not exceed 45° C. during the ripening.

Surprisingly, it has been found that the individual reaction steps (c) to (e) conform to a simple Arrhenius equation. The preexponential factor and the activation energy can be ascertained empirically by methods known to the person skilled in the art. Consequently, it is possible either for a defined reaction temperature to predict the time when the reaction will be complete, or for a defined reaction time to determine the required reaction temperature.

In contrast to the prediction methods described in the prior art, which permit only a very imprecise prediction (prediction within a range of ±2 days), with the present process it is possible to be able to predict the end of the production of the specified silica sol material to within a range of ±2 hours.

Consequently, it is possible to predict the ripening time before reaching a spinnable silica sol material with the viscosity value $V_S$ even without ascertaining the loss factor.

The viscosity value is preferably in the range from 30 to 100 Pa·s (shear rate 10 at 4° C.), preferably in the range from 35 to 70 Pa·s (shear rate 10 at 4° C.) with a loss factor (at 4° C., shear rate 10 s$^{-1}$, 1% deformation) of from 2 to 5, preferably from 2.5 to 3.5 and particularly preferably from 2.8 to 3.2, or in the corresponding ranges of another physical parameter derivable from the dynamic viscosity or mathematically related thereto.

The silica sol material produced by the process according to the invention can be further processed to give a fibre or a nonwoven fabric. In principle, the further processing of the material to give powders, monoliths and/or coatings is also conceivable. The further processing is known to the person skilled in the art.

Spinning processes of such silica sol materials to give fibres or nonwoven fabrics have been described for example in DE 196 09 551C1 and DE 10 2004 063 599 A1. The production of powder, monolith and/or a coating starting from the silica sol material according to the invention has been described for example in WO 2008/086970 A1, WO 2008/148384 A1 and WO 2009/077104 A1.

Consequently, a further aspect of the present invention is a spinnable silica sol material obtained by a process according to the invention.

Furthermore, the invention thus relates to a process for producing a fibre or a nonwoven fabric, comprising the production of a spinnable silica sol material according to the present invention and additionally the step (f) drawing of threads from the ripened silica sol material from step (e) and, in the case of a nonwoven fabric, assembling the threads to give a nonwoven fabric.

Finally, the present invention also relates to a fibre or a nonwoven fabric obtained by a process described above.

The present invention is described in more detail by reference to the examples below in conjunction with the FIGURE, but without limiting it thereto.

FIG. 1 shows the relationship between the dynamic viscosity of a silica sol material before and after the ripening.

In all of the examples, the viscosity values were determined in accordance with DIN ISO EN 3219.

Example 1

5.4 mol of TEOS (tetraethoxysiloxane) in ethanol (6.8 mol) were charged as starting materials for the hydrolysis-condensation in a closed reaction vessel. 9.6 mol of water in the form of a 0.006 N HNO$_3$ solution were mixed beforehand and then quickly added to the ethanol/TEOS mixture at 19° C. The reaction solution was after-stirred for 17 hours. The solvent was then separated off by means of a chemically inert entrainer gas stream to a viscosity of 1 Pa·s at a shear rate of 10 s$^{-1}$ at 4° C. The silica sol material was ripened standing at a temperature of 4° C. to a viscosity of 52 Pa·s at a shear rate of 10 s$^{-1}$ at 4° C. and a loss factor of 3. The points shown in FIG. 1 were ascertained by analogous experiments with the corresponding values for the viscosity after the reactive evaporation and for the loss factor after the ripening of the sol.

FIG. 1 shows by way of example the relationship between the dynamic viscosity of a silica sol material before and after the ripening. In the present example, a compensating straight line was determined which gives a mathematical relationship between $V_S$ and $V_R$. The FIGURE shows a linear relationship in good approximation between the viscosity $V_R$ before the ripening of the silica sol material (η1; determined at a shear rate of 10 at 4° C.) and the viscosity $V_S$ after the ripening (η2; determined at a shear rate of 10 s$^{-1}$ at 4° C.). The measurement values were determined for three different loss factors tan δ (2.9; 3.0 and 3.1). A rounded linear equation for the compensating straight line through all of the measurement points reads η1=12.5·η2+36.

Example 2

5.4 mol of TEOS (tetraethoxysiloxane) in ethanol (6.8 mol) were charged as starting materials for the hydrolysis-condensation in a closed reaction vessel. 9.6 mol of water in the form of a 0.006 N HNO$_3$ solution were mixed beforehand and then metered into the ethanol/TEOS mixture in a controlled manner over a period of 1 hour at constant temperature (isothermal method) of 37° C. The reaction solution was after-stirred for 17 hours until an ethanol concentration of about 68% by weight was reached. The single-phase solution was then evaporated at a constant bottom temperature of 62° C. and a pressure between 500 and 120 mbar successively to a viscosity of 1 Pa·s at a shear rate of 10 s$^{-1}$ at 4° C. The ripening of the silica sol material was carried out with stirring at a temperature of 28.1° C. to a viscosity of 55 Pa·s at a shear rate of 10 s$^{-1}$ at 4° C. and a loss factor of 3.

Example 3

Ethanol (2.6 mol; 100%) was charged to a closed reaction vessel. The remaining ethanol (4.2 mol; 100%) was metered in a controlled manner together with 5.4 mol of TEOS via an access to the ethanol in the reaction vessel over a period of one hour. At the same time, via another access to the reaction vessel, 9.6 mol of water in the form of a 0.006 N HNO$_3$ solution were metered in over a period of one hour. The reaction was carried out such that the bottom temperature in the reaction vessel during the entire reaction was 37° C. (isothermal method). The other process steps were carried out as described in Example 2, with the exception of the ripening temperature. The ripening temperature here was 4° C.

Example 4

Ethanol (6.8 mol; 100%) was charged together with 9.6 mol of water in the form of a 0.006 N HNO$_3$ solution in a closed reaction vessel. 5.4 mol of TEOS were metered into the mixture located in the reaction vessel in a controlled manner over a period of one hour. The reaction was carried out such that the bottom temperature in the reaction vessel during the entire reaction was 37° C. (isothermal method). The other process steps were carried out as described in Example 2. The ripening of the silica sol material was carried out with stirring at a temperature of 7° C. to a viscosity of 30 Pa·s at a shear rate of 10 s$^{-1}$ at 4° C. and a loss factor of 3.1.

The invention claimed is:

1. A process for producing a spinnable silica sol material comprising:
    (a) stipulating a viscosity value $V_S$, which the spinnable silica sol material should have after ripening, wherein the stipulated viscosity value $V_S$ is in the range from 30 to 100 Pa·s at a shear rate of 10 s$^{-1}$ at 4° C.,
    (b) ascertaining a viscosity value $V_R$ corresponding to $V_S$, which the silica sol material has before ripening,
    (c) combining an aqueous acid solution and a hydrolysable silicon compound, wherein the combining in (c) takes place under quasi-isothermal conditions over a period of at least 15 minutes, and wherein, in (c), the hydrolysable silicon compound is metered into an acid located in a solvent in parallel in a controlled manner,
    (d) evaporating a mixture combined in (c) to give a single-phase solution while measuring the viscosity of the mixture and terminating evaporation process upon reaching the viscosity value $V_R$,
    (e) ripening a single-phase solution obtained in (d) to give a silica sol material with the viscosity value $V_S$, wherein the ripening in (e) is carried out at temperatures of from 25° C. to 35° C., and wherein the single-phase solution is stirred;
    wherein the viscosity values $V_S$ and $V_R$ are dynamic viscosities, which are correlative and measured online and inline continuously by measurement probes within the mixture.

2. The process according to claim 1, where the combining in (c) takes place such that heat released by hydrolysis-condensation reaction is used for heating a synthesis mixture.

3. The process according to claim 1, where the hydrolysable silicon compound is a silicon compound of formula (I)

$$SiX_4 \tag{I}$$

and X in formula (I) is an optionally substituted straight-chain and/or branched $C_1$-$C_5$ alkoxy radical.

4. The process according to claim 1, where (d) is carried out in a closed apparatus in which thorough mixing is possible and in which at the same time, any solvent present can also be evaporated.

5. A spinnable silica sol material obtained by a process according to claim 1.

6. The process of claim 1, wherein the quasi-isothermal conditions are within a bottom temperature range of ±5° C.

7. The process of claim 1, wherein the quasi-isothermal conditions are within a bottom temperature range of ±2° C.

8. The process of claim 1, wherein the quasi-isothermal conditions are within a bottom temperature range of ±0.5° C.

9. The process of claim 1, wherein the ripening in (e) is carried out at temperatures of from 28.1° C. to 35° C.

10. The process of claim 1, wherein the hydrolysable silicon compound comprises tetraethoxysiloxane.

11. The process of claim 1, wherein the solvent comprises ethanol.

12. The process of claim 1, wherein the viscosity values $V_S$ and $V_R$ are in a linear relationship.

13. The process for producing a fibre and/or a nonwoven fabric, comprising producing a spinnable silica sol material according to claim 1; and
    (f) drawing threads from the ripened silica sol material from (e) and, in the case of a nonwoven fabric, assembling threads to give a nonwoven fabric.

* * * * *